Patented Aug. 29, 1950

2,520,275

UNITED STATES PATENT OFFICE 2,520,275

AROMATIC DIQUATERNARY AMMONIUM COMPOUNDS

Adrien S. Du Bois, Jersey City, N. J., and Emeric I. Valko, New York, N. Y., assignors to Onyx Oil & Chemical Company, Jersey City, N. J., a corporation of Delaware No Drawing. Application December 28, 1946, Serial No. 719,141

5 Claims. (Cl. 260—567.6)

Our invention relates to novel organic compounds which are characterized in that they contain two quaternary ammonium groups linked to an aromatic nucleus which may be either mono- or bi-cyclic and which are particularly valuable for use, inter alia, as surface active agents and as germicides.

The compounds conform to the formula

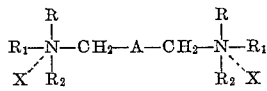

in which A represents a mono- or bi-cyclic aromatic nucleus, R represents either an alkyl or an alkenyl group containing from 8 to 18 carbon atoms, $R_1$ and $R_2$ represent methyl groups, and X represents an anion which may be, for example, a halogen atom, e. g. bromine, chlorine, or another acid radical such as acetate, benzoate, ethyl sulfate, or the hydroxyl radical.

The compounds, where it is desired that the anion component of the molecule be halogen, are best prepared by reacting an aromatic compound containing two substituted methylene halide radicals each attached directly to a carbon atom of the aromatic nucleus with two moles of a tertiary amine comprising one aliphatic group of from 8 to 18 carbon atoms and two methyl groups. On the other hand, the aromatic compound containing two methylene chloride substituents may be reacted first with two moles of a secondary amine such as dimethylamine, and the bis-tertiary-amine obtained reacted, after neutralization of the halogen acid present, with a suitable ester such as dodecyl bromide, methyl bromide, etc. In this method either the amine or the ester must, of course, contain a high molecular weight aliphatic group comprising the previously specified number of carbon atoms. In still another variation, the aromatic compound containing two methylene chloride substituents is reacted with a primary amine or with ammonia and the obtained secondary or primary amine is thereafter reacted with an ester to convert it to a quaternary ammonium compound.

As exemplary of compounds within the scope of our invention may be mentioned: 1,2-bis-(N-dodecyl - N - dimethyl ammonium bromide - N- methylene)-benzene, the chemical formula of which may be represented as follows:

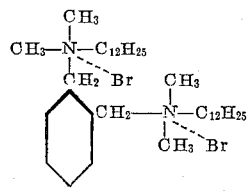

the corresponding meta and para compounds, the corresponding compounds in which the anion component is an ester radical such as acetate or benzoate, for example, a naphthalene derived compound of the formula:

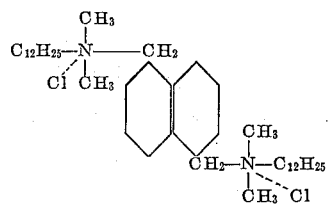

the corresponding bromine compound, 1,4-bis-(N-dodecyl-N-dimethyl ammonium bromide-N-methylene)-benzene, 1,3-bis - (N-dodecyl-N-dimethyl ammonium bromide-N-methylene) 2,4,-6-tri(methyl) benzene, and compounds of the formulae:

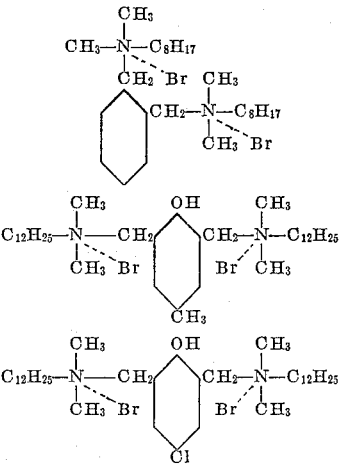

Bis-halo-compounds which may be employed in the practice of our invention include, besides those indicated above, 4,4' bis (chloromethyl) diphenyl; 1-bromo-2,5-bis (chloromethyl) 4-methyl benzene; 1-hydroxy-2,4-bis (chloromethyl)-6-methyl benzene; etc.

In the method of preparing our compounds which involves the use of tertiary amines, we may use as the tertiary amine, for example, octyl dimethyl amine, 2-ethyl hexyl dimethyl amine, dodecyl dimethyl amine, tetradecyl dimethyl amine, hexadecyl dimethyl amine, octadecyl dimethyl amine, 9-octa-decenyl dimethyl amine, and the like.

Our new products form strongly foaming aqueous solutions and exhibit a high killing power against pathogenic micro-organisms including Staphylococcus aureus and Eberthella typhosi. The preparation of some of the compounds and their germicidal activity are illus-

Example I 213 parts by weight of dodecyl dimethyl amine are heated with 132 parts of o-xylylene bromide until a temperature of 90° is reached. From this point the reaction proceeds exothermically, no externally applied heat being necessary. The temperature may go as high as 135–150° C. The product obtained, 1,2-bis-(N-dodecyl-N-dimethyl ammonium bromide-N-methylene)-benzene has the following formula:

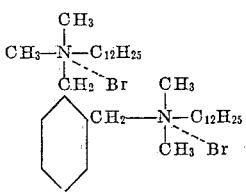

This product solidifies to a hard glassy material showing a conchoidal fracture. The phenol coefficient as determined by the method described in Circular No. 198 of the United States Department of Agriculture, is 150 against *Staphylococcus aureus* and 112 against *Eberthella typhosi* at 20° C.

Example II 30 parts of 1,5-di-chloro methyl naphthalene are heated with 60 parts of dodecyl dimethyl amine. When the temperature reaches about 110° the reaction proceeds without the application of external heat to 155°. The product produced which has the formula

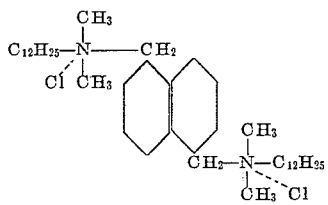

solidifies to a waxy material yielding a clear yellow solution. The phenol coefficient of this substance is 200 against *Staphylococcus aureus* and 176 against *Eberthella typhosi* at 20° C.

Example III 66 parts of p-xylylene bromide are heated with 106 parts of dodecyl dimethyl amine. The product obtained, 1,4-bis-(N-dodecyl-N-dimethyl ammonium bromide-N-methylene)-benzene which has the formula

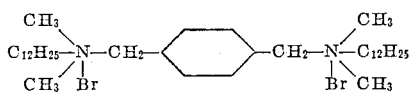

solidifies to a yellow waxy material. It is soluble to the extent of 10% in hot water but crystals separate out on cooling. This material has a phenol coefficient of 200 against *Staphylococcus aureus* and 152 against *Eberthella typhosi* at 20° C.

Example IV 54 parts of di-chloromethyl mesitylene (1,3-dichloromethyl-2,4,6-trimethyl benzene) are heated with 58 parts of dodecyl dimethyl amine. The reaction proceeds exothermically until a temperature of 140° is reached. The product, after extraction with ether, yields a clear solution in water. It is 1,3-bis-(N-dodecyl-N-dimethyl ammonium bromide-N-methylene) 2,4,6 tri(methyl) benzene and has the following formula:

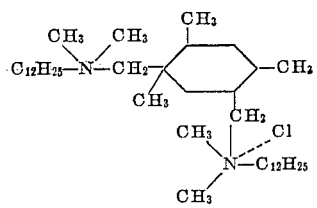

The phenol coefficient against *Staphylococcus aureus* is 160 at 20° C.; against *Eberthella typhosi* at 20° C., the coefficient is 100.

Example V 84 parts by weight of n-octyl dimethyl amine are heated with 66 parts of o-xylylene bromide to a temperature of 120° C. when the source of heat is removed. The temperature rises exothermically to 145°. The product has the formula

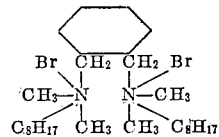

Example VI 135 parts by weight of cetyl dimethyl amine are heated with 66 parts of o-xylylene bromide to yield a product having a formula similar to that of Example I and showing a phenol coefficient of 80 against *Staphylococcus aureus* and 60 against *Eberthella typhosi*.

Example VII 10 parts by weight of 2,6-dibromo-methyl 4-methyl phenol are heated with 150 parts by weight of dimethyldodecylamine. The reaction is exothermic and cooling is applied in order to prevent the temperature from going above 160° C. The reaction product is

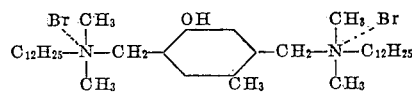

which is soluble in water. On boiling of the aqueous solution, which is strongly foaming, the product decomposes. Titration of the ionized bromine confirms the formula. The phenol coefficient is 63 against *Eberthella typhosi* and 42 against *Staphylococcus aureus* at 20° C.

Example VIII 16 parts by weight of 2,6-bis-(bromo methyl) 4-chlorophenol are mixed with 23 parts by weight of dimethyldodecylamine. The strongly exothermic reaction must be controlled by cooling, as with dry ice. The product obtained has properties similar to those of the product of the previous example. Its phenol coefficient is 94 against *Eberthella typhosi* and 42 against *Staphylococcus aureus* at 20° C. Formula

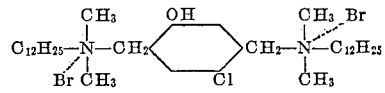

We claim:
1. Compound of the formula

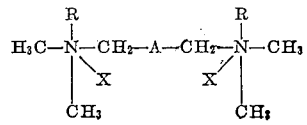

in which A is an aromatic nucleus of the group consisting of naphthalene, diphenyl, phenyl, halophenyl, hydroxyphenyl and lower alkylphenyl, R is a hydrocarbon radical of the group consisting of the alkyl and alkenyl radicals containing from 8 to 18 carbon atoms and X is an anion.

2. 1,3-bis-(N-dodecyl-N-dimethyl ammonium bromide-N methylene) 2,4,6 tri(methyl) benzene.

3. 1,4-bis-(N-dodecyl-N-dimethyl ammonium bromide-N-methylene)-benzene.

4. 1,5-(N - dodecyl - N - dimethyl ammonium chloride-N-methylene)-naphthalene.

5. 1,2-bis-(N-dodecyl-N-dimethyl ammonium bromide-N-methylene)-benzene.

ADRIEN S. DUBOIS.
EMERIC I. VALKO.

REFERENCES CITED

The following references are of record in the file of this patent:

UNITED STATES PATENTS

| Number | Name | Date |
|---|---|---|
| 2,033,092 | Bruson | Mar. 3, 1936 |
| 2,036,916 | Bruson | Apr. 7, 1936 |
| 2,108,765 | Domagk | Feb. 18, 1938 |
| 2,113,606 | Taub et al. | Apr. 12, 1938 |
| 2,138,113 | Munz | Nov. 29, 1938 |
| 2,260,967 | Bruson | Oct. 28, 1941 |
| 2,261,002 | Ritter | Oct. 28, 1941 |
| 2,263,387 | Houk et al. | Nov. 18, 1941 |
| 2,388,614 | Kirby et al. | Nov. 6, 1945 |

FOREIGN PATENTS

| Number | Country | Date |
|---|---|---|
| 700,008 | Germany | Dec. 11, 1940 |

OTHER REFERENCES

Braun et al., "Liebigs Annalen," 436 (1924), pp. 262 to 273.